(12) United States Patent
Lane et al.

(10) Patent No.: US 7,581,888 B2
(45) Date of Patent: Sep. 1, 2009

(54) BEARING WITH LUBRICANT RESERVOIR

(75) Inventors: John Lane, Beverly Hills, MI (US); Joe Hobson, Troy, MI (US); Kevin S. Hollowell, Columbus, IN (US)

(73) Assignee: Permawick Company, Birmingham, MI (US)

( * ) Notice: Subject to any disclaimer, the term of this patent is extended or adjusted under 35 U.S.C. 154(b) by 324 days.

(21) Appl. No.: 11/503,838

(22) Filed: Aug. 14, 2006

(65) Prior Publication Data

US 2007/0036476 A1 Feb. 15, 2007

Related U.S. Application Data

(60) Provisional application No. 60/707,609, filed on Aug. 12, 2005.

(51) Int. Cl.
*F16C 33/66* (2006.01)
(52) U.S. Cl. .................................. 384/397; 384/902
(58) Field of Classification Search .............. 384/279, 384/902, 322, 385–414, 462, 464, 466, 469
See application file for complete search history.

(56) References Cited

U.S. PATENT DOCUMENTS

| | | | |
|---|---|---|---|
| 297,622 A * | 4/1884 | Nel | 384/410 |
| 682,268 A | 9/1901 | Phillips | |
| 2,706,693 A | 8/1955 | Haller | |
| 2,964,363 A * | 12/1960 | Daykin et al. | 384/279 |
| 3,046,068 A | 7/1962 | Sternlicht | |
| 3,074,768 A | 1/1963 | Abel | |
| 3,131,977 A | 5/1964 | Wirtz | |
| 3,503,660 A * | 3/1970 | Mori | 384/400 |
| 3,583,778 A * | 6/1971 | Mori | 384/371 |
| 3,953,089 A | 4/1976 | Dainin | |
| 4,609,293 A | 9/1986 | Bayer et al. | |
| 5,281,035 A | 1/1994 | Lo | |
| 6,505,971 B2 | 1/2003 | Sugimoto et al. | |
| 6,540,404 B1 * | 4/2003 | Dornhoefer et al. | 384/279 |
| 6,746,155 B2 | 6/2004 | Chen | |
| 6,832,853 B2 | 12/2004 | Fujinaka | |

* cited by examiner

*Primary Examiner*—Thomas R Hannon
(74) *Attorney, Agent, or Firm*—Clark Hill PLC

(57) ABSTRACT

A bearing for storing a lubricant and supplying the lubricant to a shaft is provided. The bearing includes an inner wall defining an axial bore adapted for receiving the shaft therethrough and an outer wall spaced apart from the inner wall. The bearing also includes a connecting portion disposed between the inner and outer walls and extending axially between first and second faces. At least one reservoir extends axially into the connecting portion between an open end at the first face and a closed end spaced apart from the second face for retaining and supplying the lubricant to the shaft.

9 Claims, 6 Drawing Sheets

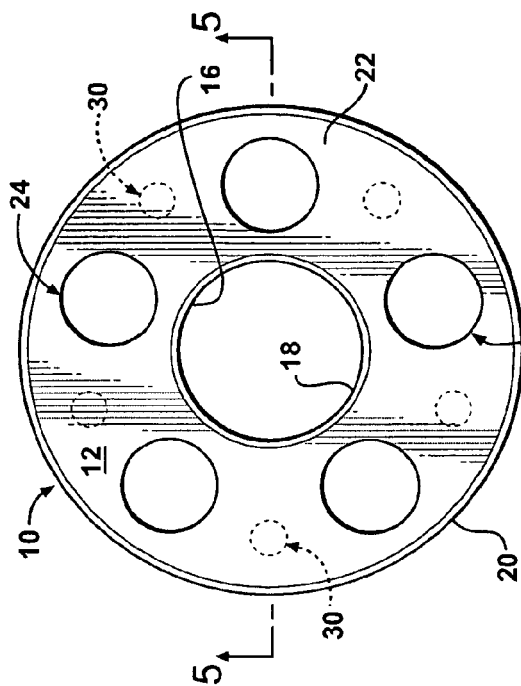
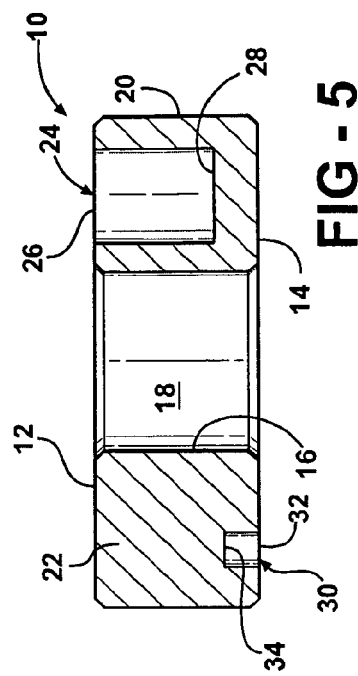
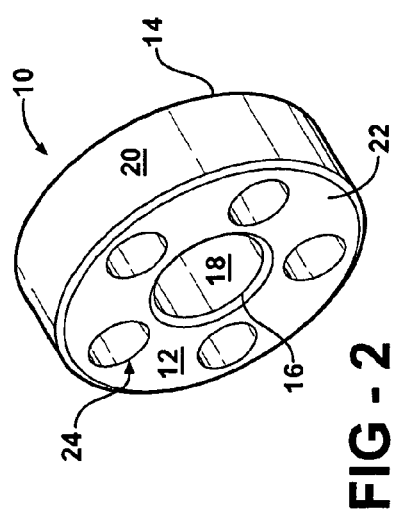
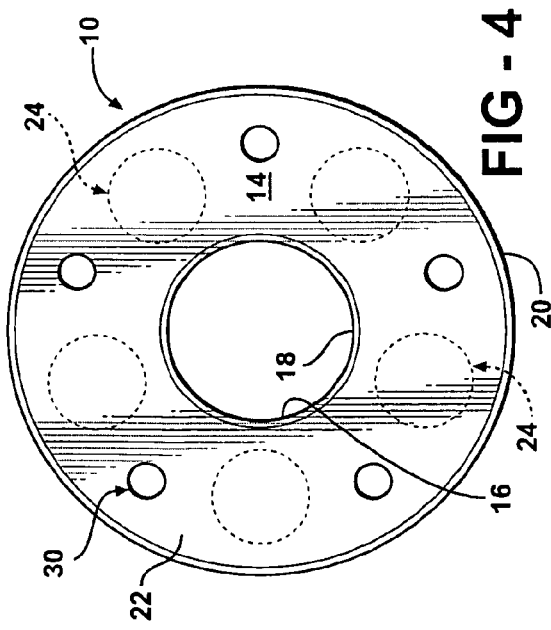

BEARING WITH LUBRICANT RESERVOIR

BACKGROUND OF THE INVENTION

1. Field of the Invention

The invention relates to bearings for a shaft of a motor. More particularly, this invention relates to bearings having at least one reservoir to store a lubricant for lubricating a shaft of a motor.

2. Description of Related Art

Various bearings have been developed for lubricating a shaft of an electric motor. Sintered metal bearings are the most common type of bearings utilized for this purpose and are well known in the art. Such sintered bearings are generally formed from a porous metal, which is impregnated with a lubricant such as oil, to lubricate the shaft. An example of a conventional oil-impregnated sintered bearing is disclosed in U.S. Pat. No. 6,505,971.

To ensure a longer service life for the bearing, added oil storage is provided by placing an additional lubricant in a cavity around a conventional oil-impregnated sintered bearing. A bearing device in accordance with the prior art is shown in FIG. 1 which includes an oil-impregnated sintered bearing 10 held in place within an end shield 12 by a spring retainer 14. The bearing 10 includes an outer surface 16 and an inner surface 18 defining a bore for receiving a rotatable motor shaft (not shown). An additional lubricant 20 is deposited in a cavity 22 formed in the end shield 12 around the outer surface 16 of the bearing 10 and is absorbed into the bearing 10 through capillary action and delivered to the inner surface 18 for lubricating the motor shaft extending therethrough.

U.S. Pat. No. 2,706,693 discloses another type of oil-impregnated sintered bearing having a reservoir or cavity formed within a bearing body for filling or charging with a lubricant. This may be done by immersing the bearing body in a hot bath of oil, especially one which is boiling. It may also be done by immersing the bearing body in a heated oil bath in a vacuum tank from which the air has been removed by an air pump, causing the air and other gases to be drawn out of the reservoir through the pores of the bearing body. A still further method of charging the reservoir with lubricant is to place it in a cylinder containing a thin grease or oil and applying pressure upon a piston to force the grease or oil through the pores of the bearing into the reservoir or cavity. An inherent drawback with this type of bearing is the complicated and inefficient process of filling the internal reservoir.

To overcome the difficulty of filling an internal reservoir such as that described above, U.S. Pat. No. 3,953,089 discloses a sintered bearing having a cylindrical body provided with three passages or reservoirs equi-angularly spaced and extending fully through the body. The reservoirs may be filled with a suitable lubricant to provide a relatively large reserve of lubricant which over an extended period of time will percolate through the pores in the bearing body to lubricate a shaft and which will be effective to maintain proper lubrication of the bearing for an extended period of service. It will be appreciated that the process of filling each reservoir with lubricant is simplified due to having unrestricted access to each end of the reservoir through which the lubricant may be introduced or injected.

To reduce costs and cut down on inefficiencies, automated processes are being employed to fill the reservoirs or cavities in the bearings with lubricant. Consequently, it is desirable to provide an improved bearing having one or more reservoirs formed specifically for receiving a lubricant using an automated process.

SUMMARY OF THE INVENTION

According to one aspect of the invention, a bearing is provided for storing a lubricant and supplying the lubricant to a shaft. The bearing includes an inner wall defining an axial bore adapted for receiving the shaft therethrough. The bearing also includes an outer wall spaced apart from the inner wall. The bearing further includes a connecting portion disposed between the inner and outer walls and extending axially between a first face and a second face. At least one reservoir extends axially into the connecting portion between an open end at the first face and a closed end spaced apart from the second face for retaining and supplying the lubricant to the shaft.

According to another aspect of the invention, a bearing is provided for storing a lubricant and supplying the lubricant to a shaft. The bearing includes an inner wall defining an axial bore adapted for receiving the shaft therethrough. The bearing also includes an outer wall spaced apart from the inner wall. The bearing further includes a connecting portion disposed between the inner and outer walls and extending axially between first and second faces. The connecting portion includes at least one reservoir open to the outer wall. The at least one reservoir extends axially between the first and second faces, and includes a pair of spaced apart side walls which approach one another as they extend from a bottom portion of the at least one reservoir to the outer wall for retaining the lubricant within the at least one reservoir.

According to still another aspect of the invention, a bearing is provided for storing a lubricant and supplying the lubricant to a shaft. The bearing includes an inner wall defining an axial bore adapted for receiving the shaft therethrough. The bearing also includes an outer wall spaced apart from the inner wall. The bearing further includes a connecting portion disposed between the inner and outer walls and extending axially between first and second faces. The connecting portion includes at least one reservoir open to the outer wall. The at least one reservoir extends axially between an open end at the first face and a closed end spaced apart from the second face. The at least one reservoir includes a pair of spaced apart side walls which approach one another as they extend from a bottom portion of the at least one reservoir to the outer wall for retaining the lubricant within the at least one reservoir.

BRIEF DESCRIPTION OF THE DRAWINGS

Advantages of the present invention will be readily appreciated as the same becomes better understood by reference to the following detailed description when considered in connection with the accompanying drawings wherein:

FIG. 2 is a perspective view illustrating a sintered bearing having reservoirs according to a first embodiment of the invention;

FIG. 3 is an end view illustrating a first face of the bearing in FIG. 2;

FIG. 4 is an end view illustrating a second face of the bearing in FIG. 2;

FIG. 5 is a cross-sectional view of the bearing in FIG. 3;

DETAILED DESCRIPTION OF THE PREFERRED EMBODIMENTS

Figure 1:
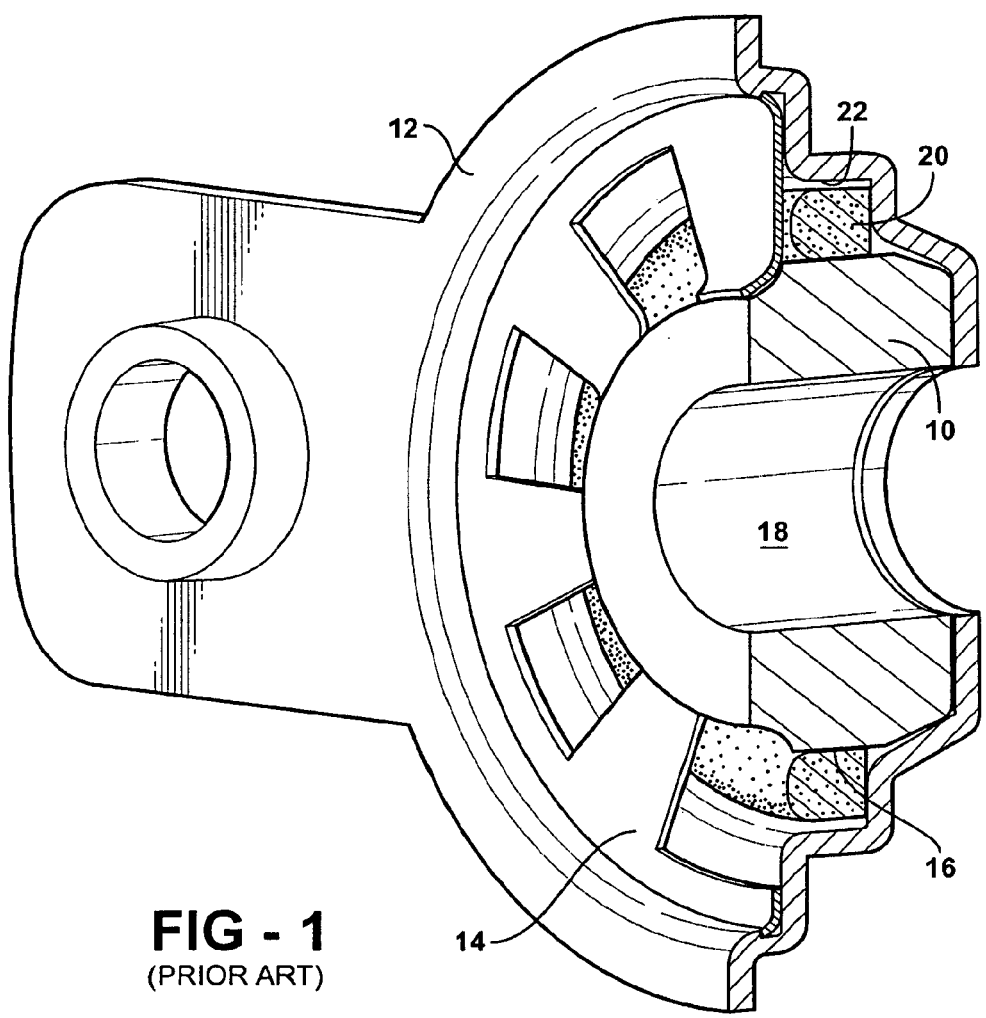
FIG. 1 is a cross-section of a perspective view illustrating a conventional sintered bearing with a lubricant deposited in an exterior cavity.

Referring to FIGS. 2 through 5, a sintered metal bearing, generally shown at 10, is provided for use in applications such as with fractional horsepower electric motors. The bearing 10 includes opposing first 12 and second 14 faces. An axial bore 16 extends between the first 12 and second 14 faces for receiving a motor shaft (not shown) therethrough. The axial bore 16 is defined by a cylindrical inner wall 18. A cylindrical outer wall 20 is spaced apart from the inner wall 18 defining a connecting or body portion 22 therebetween. The bearing 10 is a porous metal, typically iron-graphite or bronze, impregnated with a bearing oil to lubricate the shaft. Further, although the bearing 10 is cylindrical in the current embodiment, it is appreciated that the particular shape of the bearing 10 may vary.

Referring to FIG. 3, the connecting portion 22 of the bearing 10 includes a plurality of reservoirs, generally indicated at 24 for storing an additional lubricant such as applicant's Permawick® or PermaGel® lubricants to provide added oil storage for longer bearing service life. Permawick® is a blend of engineered fiber and bearing oil. PermaGel® is a plastic-like gel blended from bearing oil and thickening additives. Permawick® or PermaGel® can be pressure injected into each reservoir 24 as will be further described below. During bearing use, the oil contained in the additional lubricant stored in the reservoirs 24 is released due to capillary pull of the sintered bearing 10 on an as-needed basis and is delivered to the inner wall 18 of the bore 16 to lubricate the shaft. The added oil storage and controlled release rate greatly extends bearing service life.

Each of the reservoirs 24 is generally cylindrical in shape and extends axially through the connecting portion 22 between an open end 26 at the first face 12 of the bearing 10 and a closed end 28 spaced apart from the second face 14, as shown in FIG. 5. The reservoirs 24 are equi-angularly spaced about the axial bore 16 and are disposed substantially medially between the inner 18 and outer walls 20 of the bearing 10. It will be appreciated that the bearing 10 may include any number of reservoirs 24, and the reservoirs 24 can be any shape and size as long as the structural integrity of the bearing 10 is not compromised.

Referring to FIG. 4, the connecting portion 22 of the bearing 10 also includes a plurality of alignment holes, generally indicated at 30 for aligning the bearing 10 in order to fill the reservoirs 24 with the additional lubricant using an automated injection process. Each of the alignment holes 30 is generally cylindrical in shape and extends axially through the connecting portion 22 between an open end 32 at the second face 14 of the bearing 10 and a closed end 34 spaced apart from the first face 12, as shown in FIG. 5. Thus, in the embodiment shown, the alignment holes 30 are open to the second face 14 while the reservoirs 24 are open to the first face 12. It will, however, be appreciated that the open end 32 of the alignment holes 30 may be at the first face 12 of the bearing 10 such that both the alignment holes 30 and the reservoirs 24 are open to the first face 12 without varying from the scope of the invention.

The alignment holes 30 are equi-angularly spaced about the axial bore 16, and in the embodiment shown, are disposed closer to the outer wall 20 than the inner wall 18. The alignment holes 30 are offset angularly from the reservoirs 24 resulting in each alignment hole 30 being located axially between two adjacent reservoirs 24. It will be appreciated that the bearing 10 may include any number of alignment holes 30 without varying from the scope of the invention.

The automated injection process is performed using an injection machine (not shown) having a plurality of dowel pins (not shown) that are inserted into the alignment holes 30 in the bearing 10, thereby aligning the reservoirs 24 relative to individual injection nozzles (not shown). The injection nozzles precisely meter a measured amount of the additional lubricant into each of the reservoirs 24. Once the reservoirs 24 are filled the bearing 10 can be installed directly into an electric motor or the bearing 10 may be packaged and shipped for installation at a remote facility.

Figure 6:
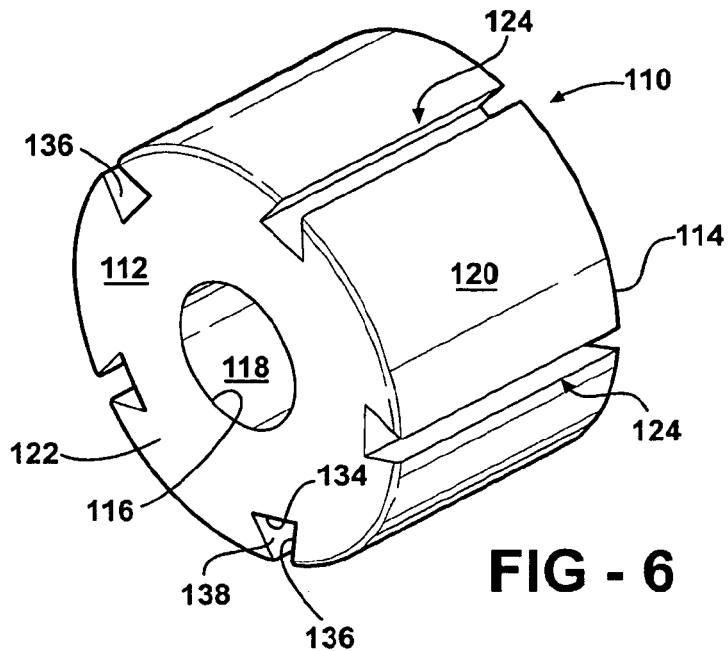
FIG. 6 is a perspective view illustrating a sintered bearing according to a second embodiment of the invention.
Figure 7:
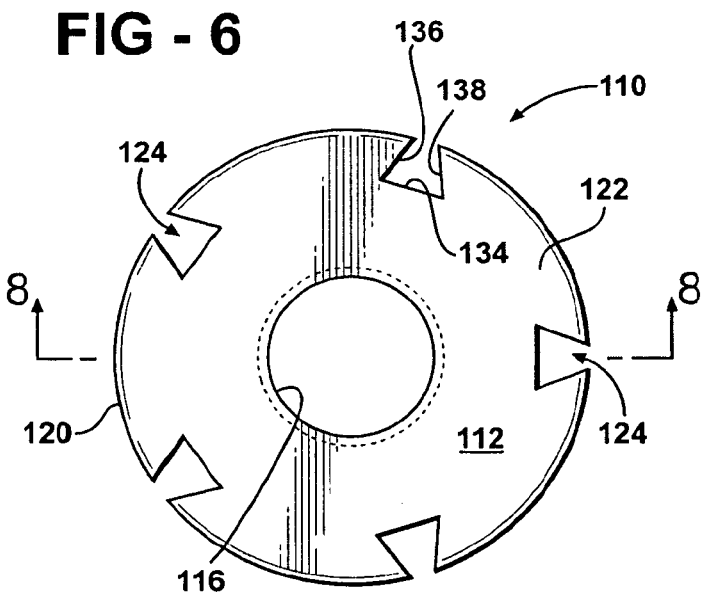
FIG. 7 is an end view of the second embodiment of the bearing in FIG. 6.
Figure 8:
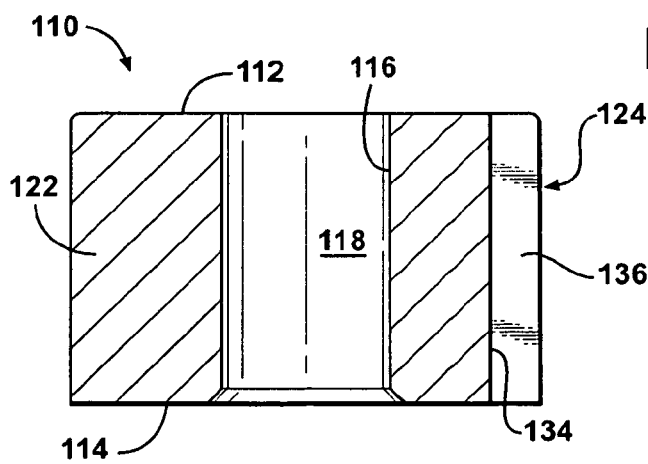
FIG. 8 is a cross-sectional view of the second embodiment of the bearing in FIG. 7.

Referring to FIGS. 6 through 8, according to a second embodiment of the invention, the connecting portion 122 of the bearing 110 defines a plurality of recessed channels or reservoirs, generally indicated at 124. Each of the reservoirs 124 extend axially between the first 112 and second 114 faces of the bearing 110. As described above, the reservoirs 124 may be filled with the additional lubricant, which is then delivered to the shaft over time. In the embodiment shown, the bearing 110 includes five reservoirs 124 equi-angularly spaced about the axial bore 116. The reservoirs 124 are open along the outer wall 120. The reservoirs 124 include a bottom surface 134 and spaced apart side walls 136, 138 extending between the bottom surface 134 and the outer wall 120. Preferably, the spaced apart side walls 136, 138 approach one another as they extend out from the bottom surface 134 forming a generally triangular-shaped or tapered reservoir 124 in order to help retain the additional lubricant within the respective reservoir 124. It is, however, contemplated that the particular configuration of the reservoirs 124 may vary.

Figure 9:
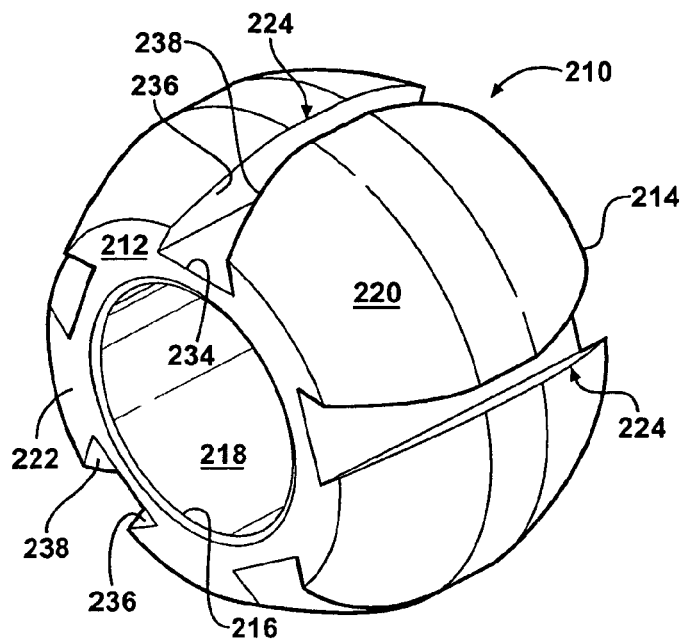
FIG. 9 is a perspective view illustrating a bearing according to a third embodiment of the invention.
Figure 10:
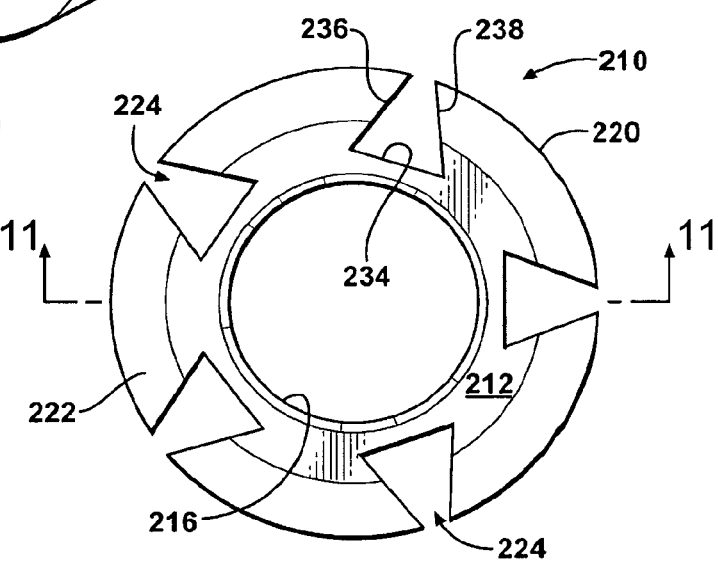
FIG. 10 is an end view of the third embodiment of the bearing in FIG. 9.
Figure 11:
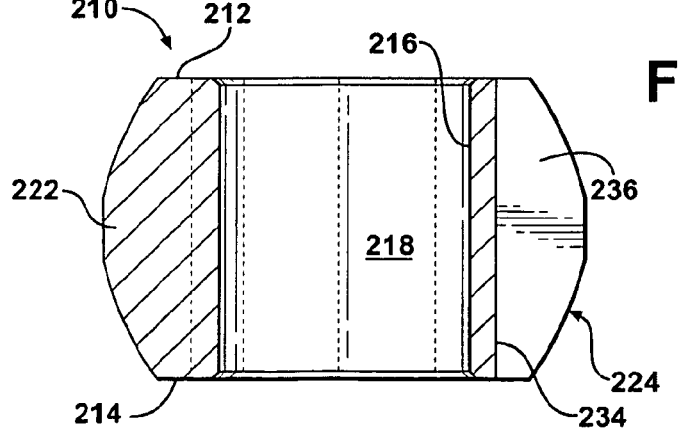
FIG. 11 is a cross-sectional view of the third embodiment of the bearing in FIG. 10.

Referring to FIGS. 9 through 11, according to a third embodiment of the invention, the outer wall 220 of the bearing 210 is generally spherical. As with the bearing 110 in the second embodiment set forth above, the connecting portion 222 defines the plurality of reservoirs, generally indicated at 224. Each of the reservoirs 224 extend axially between the first 212 and second 214 faces of the bearing 210. In the embodiment shown, the bearing 210 includes five reservoirs 224 equi-angularly spaced about the axial bore 216. The reservoirs 224 are open along the outer wall 220 and include a bottom surface 234 and spaced apart side walls 236, 238. The spaced apart side walls 236, 238 approach one another as they extend from the bottom surface 234 to the outer wall 220 forming a generally triangular-shaped or tapered reservoir 224 in order to help retain the additional lubricant within the respective reservoir 224.

Figure 12:
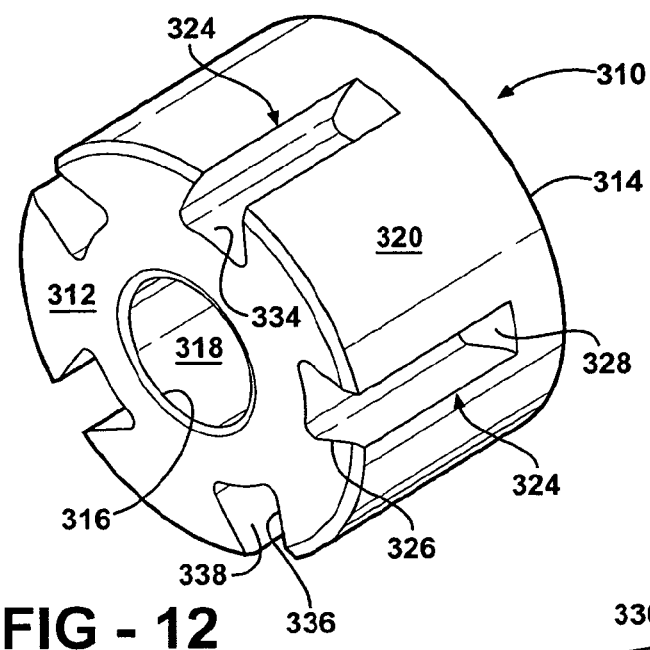
FIG. 12 is a perspective view illustrating a bearing according to a fourth embodiment of the invention.
Figure 13:
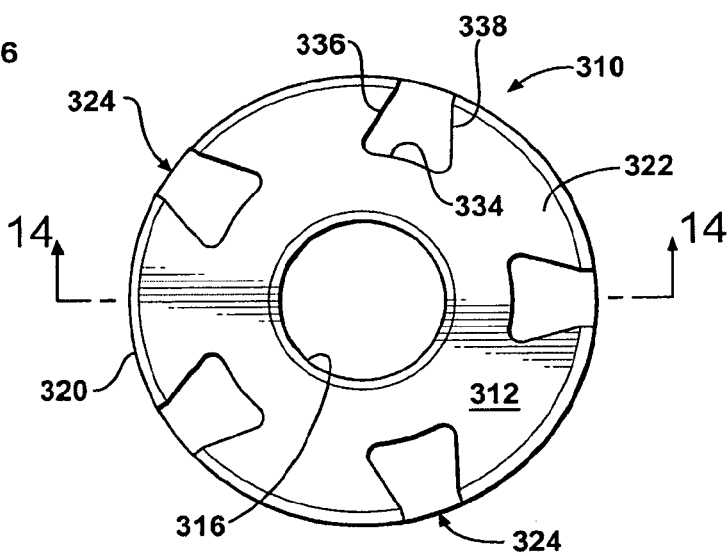
FIG. 13 is an end view of the fourth embodiment of the bearing in FIG. 12.
Figure 14:
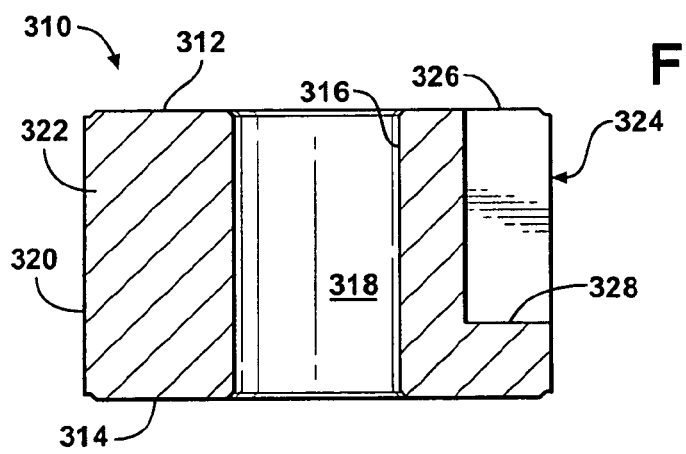
FIG. 14 is a cross-sectional view of the fourth embodiment of the bearing in FIG. 13.

Referring to FIGS. 12 through 14, according to a fourth embodiment of the invention, each of the plurality of reservoirs 324 is open along the outer wall 320 and extends axially between an open end 326 and a closed end 328. The open end 326 of each reservoir 324 is located at the first face 312 of the bearing 310. The closed end 328 of each reservoir 324 is, however, spaced inwardly or axially from the second face 314 of the bearing 310. Thus, each of the plurality of reservoirs 324 in the fourth embodiment does not extend between the first 312 and second 314 faces of the bearing 310 as shown in the second and third embodiments.

Figure 15:
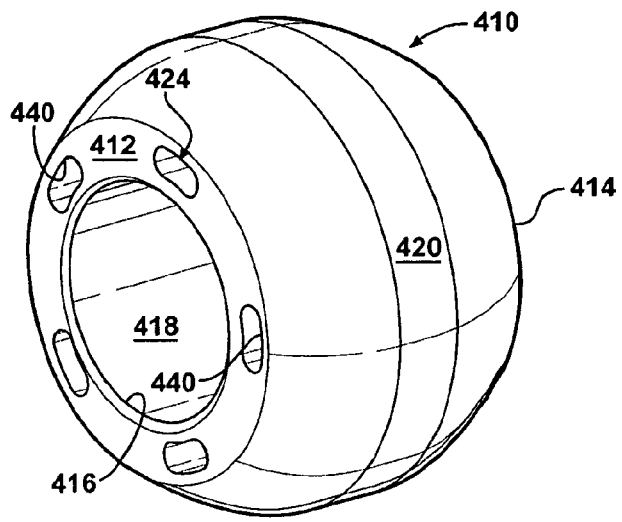
FIG. 15 is a perspective view illustrating a bearing according to a fifth embodiment of the invention.
Figure 16:
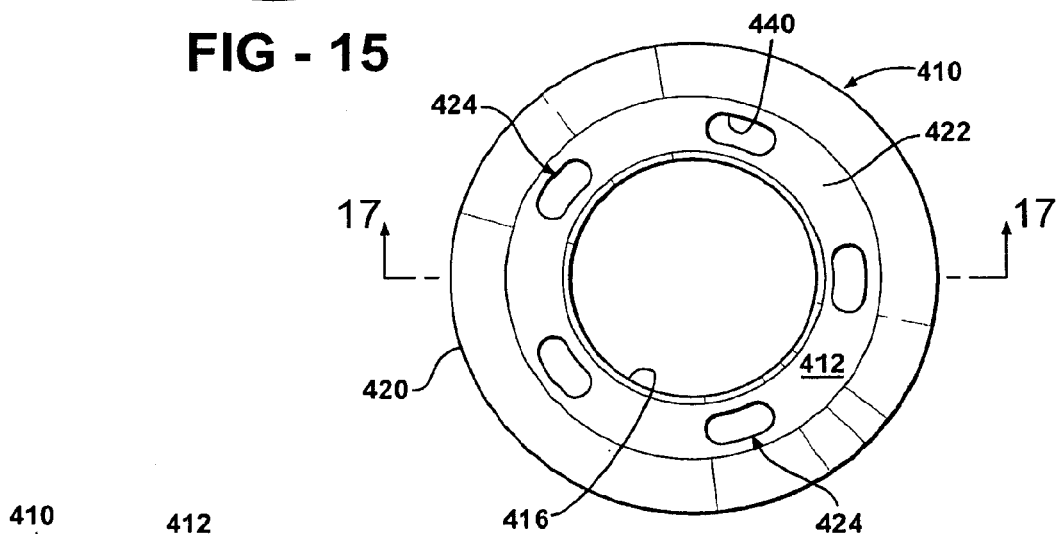
FIG. 16 is an end view of the fifth embodiment of the bearing in FIG. 15.
Figure 17:
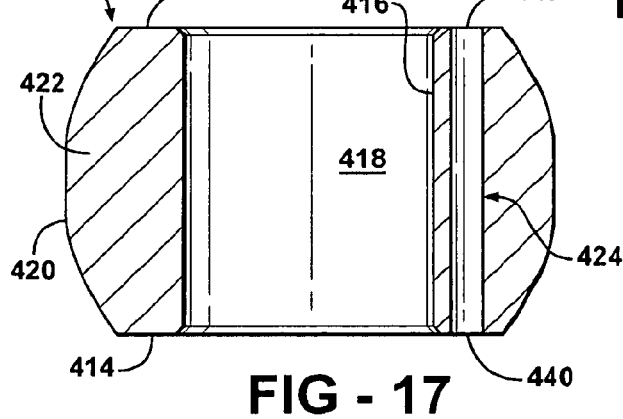
FIG. 17 is a cross-sectional view of the fifth embodiment of the bearing in FIG. 16.

Referring to FIGS. 15 through 17, according to a fifth embodiment of the invention, each of the plurality of reservoirs 424 extends through the connecting portion 422 of the bearing 410 between the first 412 and second 414 faces. Openings 440 at each end of the reservoirs 424 provide access for receiving the additional lubricant. Although not shown, it will be appreciated that alignment holes similar to the alignment holes 30 shown in the first embodiment may be included in either the first 412 or second face 414 for aligning the bearing 410 in order to fill the reservoirs 424 with the additional lubricant using the automated injection process.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A bearing for storing a lubricant and supplying the lubricant to a shaft, said bearing comprising:

an inner wall defining an axial bore adapted for receiving the shaft;

an outer wall spaced apart from said inner wall;

a connecting portion disposed between said inner and outer walls and extending axially between a first face and a second face;

at least one reservoir extending axially into said connecting portion between an open end at said first face and a closed end spaced apart from said second face for retaining and supplying the lubricant to the shaft; and a plurality of alignment holes extending axially into said connecting portion between an open end at one of said first and second faces and a closed end spaced apart from the other of said first and second faces, said plurality of alignment holes for aligning said bearing to fill said at least one reservoir with the lubricant.

2. A bearing as set forth in claim 1 wherein said connecting portion includes a plurality of equi-angularly spaced reservoirs disposed about said axial bore.

3. A bearing as set forth in claim 2 wherein each of said reservoirs is a generally cylindrical bore.

4. A bearing as set forth in claim 3 wherein said connecting portion includes a plurality of equi-angularly spaced alignment holes disposed about said axial bore.

5. A bearing as set forth in claim 4 wherein each of said alignment holes is a generally cylindrical bore.

6. A bearing as set forth in claim 5 wherein said alignment holes are angularly offset from said reservoirs.

7. A bearing as set forth in claim 1 wherein said at least one reservoir is open to said outer wall.

8. A bearing as set forth in claim 7 wherein said at least one reservoir includes a pair of spaced apart side walls which approach one another as they extend from a bottom portion of said at least one reservoir to said outer wall for retaining the lubricant within said at least one reservoir.

9. A bearing as set forth in claim 8 wherein said outer wall is generally spherical.

* * * * *